United States Patent
Fujii et al.

(10) Patent No.: US 7,625,010 B2
(45) Date of Patent: Dec. 1, 2009

(54) SEAT BELT DEVICE

(75) Inventors: Hiroaki Fujii, Hikone (JP); Shigeru Kohama, Yamatokooriyama (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/081,772

(22) Filed: Apr. 21, 2008

(65) Prior Publication Data

US 2008/0277915 A1   Nov. 13, 2008

Related U.S. Application Data

(62) Division of application No. 10/718,543, filed on Nov. 24, 2003.

(30) Foreign Application Priority Data

Jan. 24, 2003 (JP) ............................. 2003-016498
Aug. 8, 2003 (JP) ............................. 2003-290194

(51) Int. Cl.
*B60R 22/18* (2006.01)
*B60R 22/00* (2006.01)

(52) U.S. Cl. .................. 280/801.1; 297/469; 24/265 H; 24/192; 24/599.1

(58) Field of Classification Search .............. 280/801.1; 297/469; 24/265 H, 601.5, 599.1, 192, 189
See application file for complete search history.

(56) References Cited

U.S. PATENT DOCUMENTS

| | | | | |
|---|---|---|---|---|
| 3,128,520 A | * | 4/1964 | Carter et al. | ................ 24/598.5 |
| 3,897,082 A | * | 7/1975 | Takada et al. | ................ 280/802 |
| 4,224,722 A | * | 9/1980 | Mikosz et al. | ............... 24/601.5 |
| 4,272,104 A | * | 6/1981 | Cuny | ........................ 280/801.1 |
| 4,575,118 A | * | 3/1986 | Matsui et al. | ............ 280/801.1 |
| 4,790,597 A | * | 12/1988 | Bauer et al. | ................. 297/468 |
| 4,909,539 A | * | 3/1990 | Morner | .................... 280/801.1 |
| 6,069,325 A | * | 5/2000 | Aoki | ........................... 177/136 |

\* cited by examiner

*Primary Examiner*—Paul N. Dickson
*Assistant Examiner*—George D. Spisich
(74) *Attorney, Agent, or Firm*—Foley & Lardner LLP

(57) ABSTRACT

A seat belt device allows easy connection of a lap anchor fixed to one end of a seat belt relative to a vehicle body or the like even when a seat weight sensor is installed below a vehicle seat. The seat weight sensor and the vehicle seat are fixed to a vehicle body floor. A hitch member is attached to the seat weight sensor via a mounting bracket by a bolt. A lap anchor is locked to a hitch member by an engaging hook of the lap anchor. The hitch member is directly attached to a mounting bracket of the seat weight sensor. The mounting bracket is positioned between a seat rail and the seat weight sensor.

10 Claims, 13 Drawing Sheets

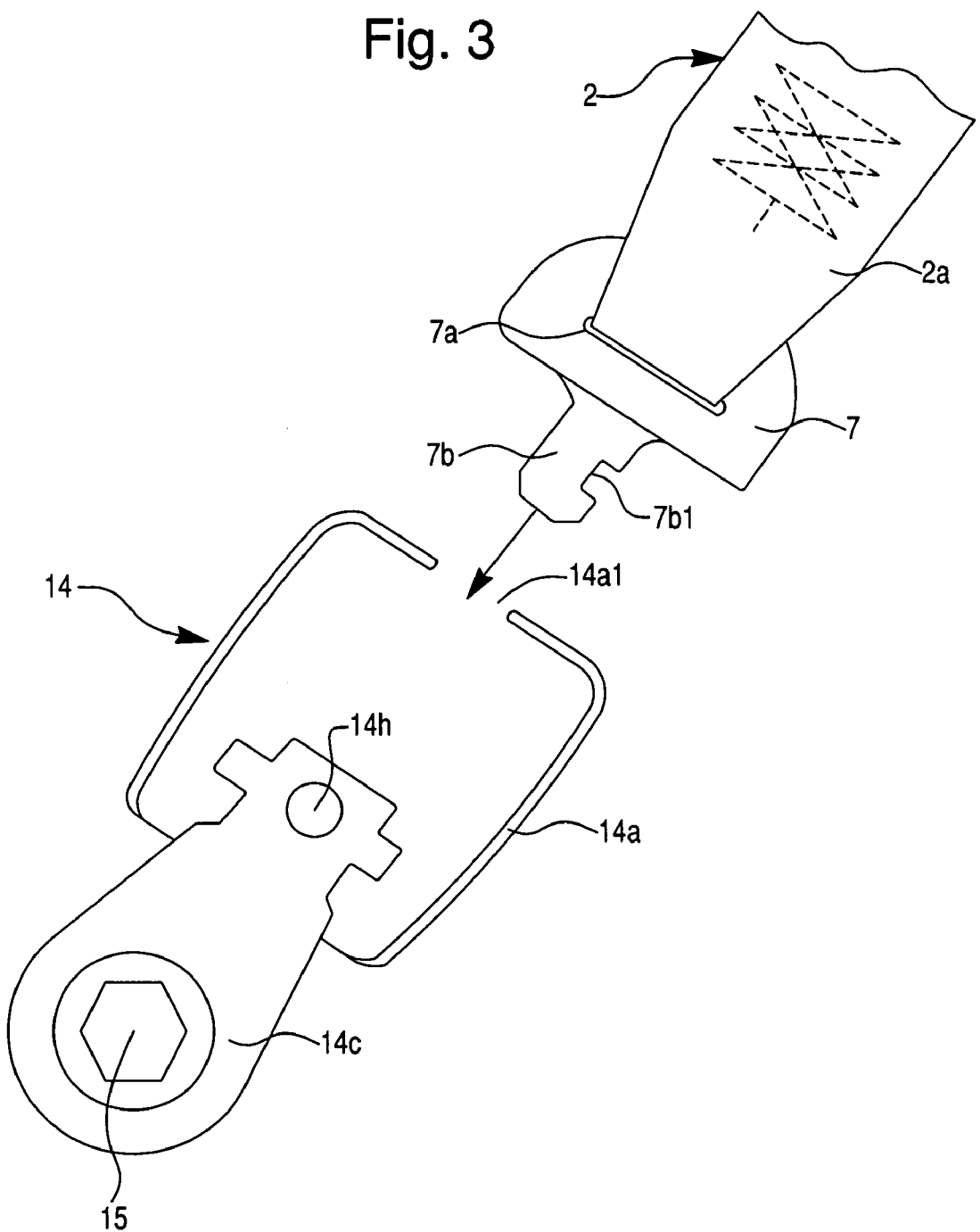

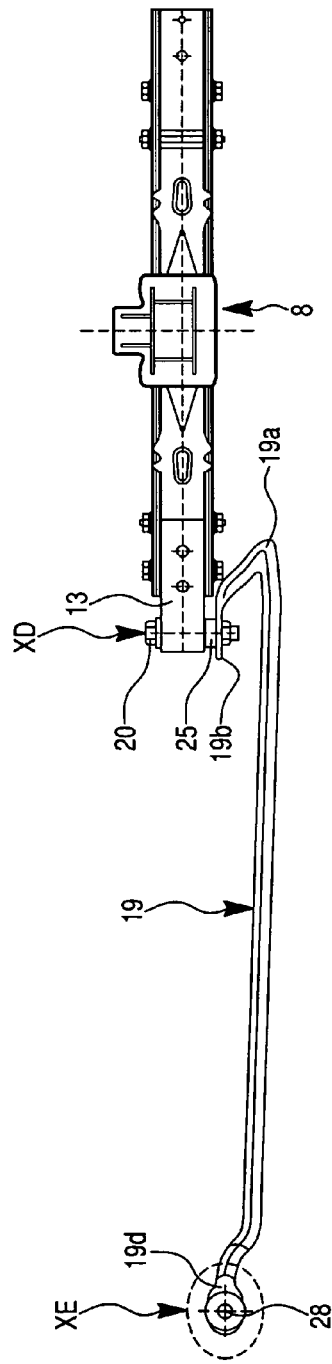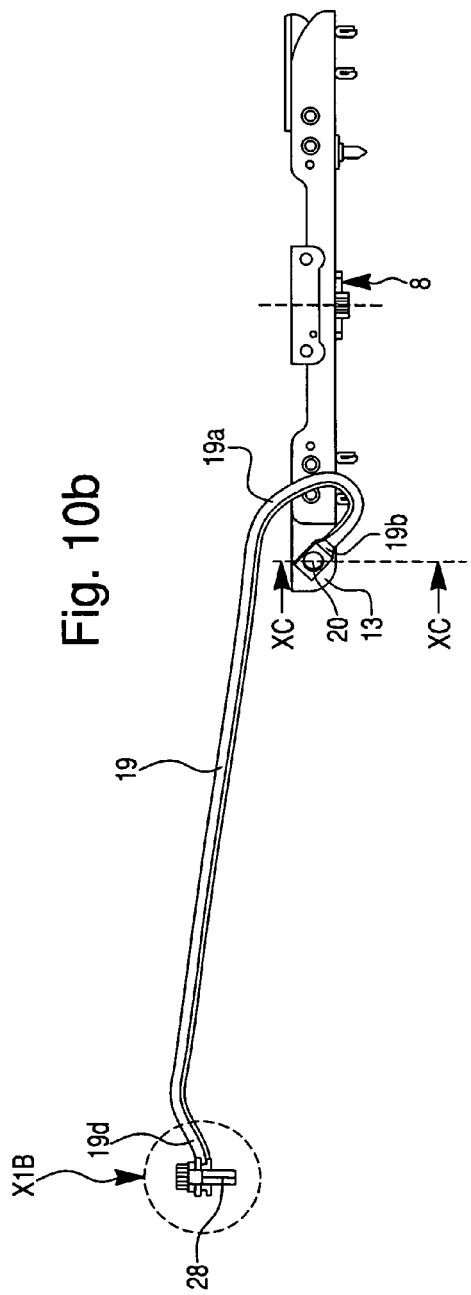

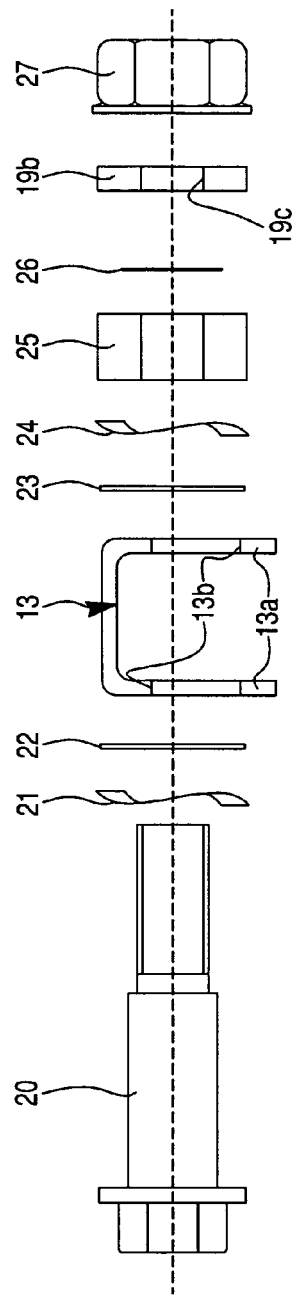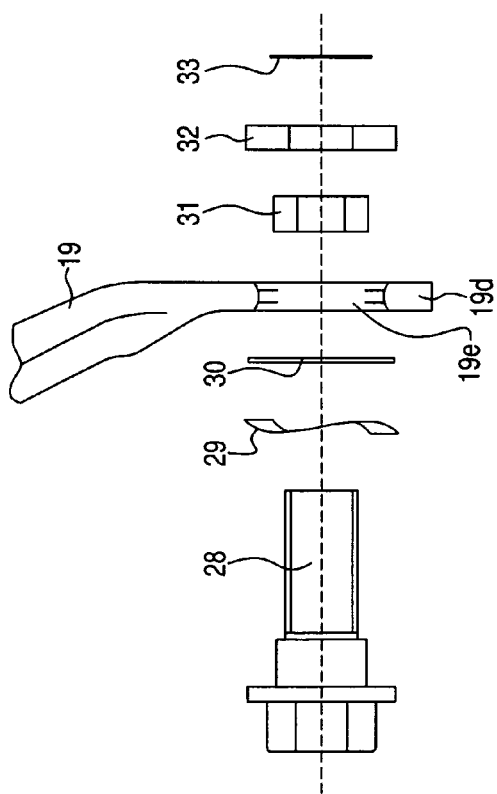
Fig. 11a
Fig. 11b

SEAT BELT DEVICE

CROSS REFERENCE TO RELATED PATENT APPLICATIONS

This application is a Divisional Application of U.S. patent application Ser. No. 10/718,543, filed Nov. 24, 2003, which is incorporated herein by reference in its entirety.

BACKGROUND OF THE INVENTION

The present invention pertains to a technical field of a seat belt device of which a seat belt for restraining and protecting an occupant sitting on a vehicle seat is connected to a vehicle body on a side of the vehicle seat and, particularly, to a technical field of a seat belt device for a vehicle seat which is provided at its lower portion with a seat weight sensor for measuring a seat load applied to the vehicle seat.

Conventionally, a seat belt device installed in a vehicle such as an automobile prevents an occupant from jumping out of a vehicle seat by restraining the occupant with a seat belt thereof, thereby protecting the occupant in the event of emergency.

As such seat belt device, three-point-type seat belt devices which are conventionally well known are generally employed. In a three-point-type seat belt device, one end of a seat belt is connected to a vehicle body or a vehicle seat fixed to the vehicle body on a side of the vehicle seat via a lap anchor fixed to the seat belt, while the other end of the seat belt is connected to a seat belt retractor. In this case, a middle portion of the seat belt is guided by a deflective fitting attached to an upper portion of a side of the vehicle body.

When the seat belt is not worn, the seat belt is wound by the seat belt retractor and is positioned to extend along the side of the vehicle body. By latching a tongue slidably supported by the seat belt with a buckle fixed to the vehicle body on the opposite side of the lap anchor side about the vehicle seat, an occupant sitting in the vehicle seat puts on the seat belt. In this state, a portion of the seat belt between the tongue and the deflective fitting (seat belt retractor side) functions as a shoulder belt for restraining and protecting an upper body of the occupant from his or her shoulder to his or her chest, while a portion of the seat belt between the tongue and the lap anchor functions as a lap belt for restraining and protecting a lower body of the occupant such as his or her abdomen.

On the other hand, in recent years, it has been developed to control the action of the seat belt device depending on the weight (body weight) of the occupant. In such seat belt device, a seat weight sensor for measuring the seat load, applied to the vehicle seat by the weight of the occupant and the like, is installed below the vehicle seat and between the vehicle seat and a vehicle body floor. By controlling the action of the seat belt device depending on the weight of the occupant based on the seat load measured by the seat weight sensor, the occupant can be effectively restrained by the seat belt, as described in Japanese Patent Unexamined Publication No. H11-304579, and Japanese Patent Unexamined Publication No. H11-351952 (both incorporated by reference).

In the seat belt device for the vehicle seat which is provided at its lower portion with the seat weight sensor, the lap anchor for connecting one end of the seat belt to a vehicle body is positioned on a side of the seat weight sensor. However, since convex structural components of the vehicle body such as a pillar and a side sill depending on the vehicle structure exist on the side of the seat weight sensor, the space on the side of the seat weight sensor must be significantly narrow. Therefore, it is a bother and thus difficult to connect the lap anchor fixed to the end of the seat belt to the vehicle body floor or the vehicle seat or the seat weight sensor fixed to the vehicle body so that the work for this must require a lot of labor and time.

SUMMARY OF THE INVENTION

The present invention was made under the aforementioned circumstances and the object of the present invention is to provide a seat belt device which allows easy connection of a lap anchor fixed to one end of a seat belt relative to a vehicle body or the like even when a seat weight sensor is installed below a vehicle seat.

To solve the aforementioned problems, the present invention is a seat belt device comprising a seat belt for restraining and protecting an occupant sitting on a vehicle seat, and a lap anchor fixed to an end of the seat belt, wherein the seat belt is connected to a vehicle body on a side of the vehicle seat via the lap anchor, a seat weight sensor installed below the vehicle seat measures a seat load applied to said vehicle seat, and the action of the seat belt device is controlled on the basis of the measured value of the seat load, and a hitch member is attached to either one of said vehicle body, said vehicle seat fixed to the vehicle body, or said seat weight sensor fixed to the vehicle body; and that said lap anchor is locked to the hitch member.

The present invention further comprises a locking member for preventing the release of the locking between said lap anchor and said hitch member.

The hitch member of an embodiment of the present invention comprises a slide bar of which one end is attached to said seat weight sensor, which extends from said one end toward the rear of the vehicle, and of which the other end is attached to the vehicle body and that said lap anchor is connected to said slide bar such that said lap anchor is movable along said slide bar. According to embodiments of the present invention, an end of the seat belt can be easily connected to a vehicle body even when a seat weight sensor is installed below a vehicle seat, just by locking a lap anchor fixed to the end of the seat belt to a hitch member attached to either one of the vehicle body, the vehicle seat fixed to the vehicle body, or the seat weight sensor fixed to the vehicle body. Accordingly, the labor and time required for connecting the seat belt can be significantly reduced, thus improving the workability and the productivity.

Since the locking member is provided, the locking between the lap anchor and the hitch member is prevented from being easily released by the locking member.

Further, according to another embodiment, in case that the seat belt device is installed to a vehicle such as a vehicle of two-door type, when a rear seat passenger is about to get on or off the vehicle, the lap anchor is moved along the slide bar so that the lap anchor is set at its standby position and then the rear seat passenger gets on or off the vehicle. Therefore, the lap belt does not disturb the action of the passenger because the lap anchor is set at the standby position, thereby allowing the passenger to easily get in or out of the vehicle. After the passenger gets in the vehicle, an occupant sitting on a front seat can normally put on the seat belt by setting the lap anchor at its working position.

It is to be understood that both the foregoing general description and the following detailed description are exemplary and exemplary only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 2(a), 2(b) specifically show portions of the seat belt device of an embodiment wherein FIG. 2(a) is a rear view partially showing the seat belt device and FIG. 2(b) is a side view partially showing the seat belt device.

FIG. 3 is a perspective view schematically showing a lap anchor and a hitch member used in the embodiment shown in FIGS. 2(a), 2(b).

FIGS. 4(a), 4(b) are illustrations similar to FIGS. 2(a), 2(b), but showing another embodiment of the present invention wherein FIG. 4(a) is a rear view partially showing the seat belt device and FIG. 4(b) is a side view partially showing the seat belt device.

FIGS. 5(a), 5(b) are illustrations similar to FIGS. 2(a), 2(b), but showing still another embodiment of the present invention wherein FIG. 5(a) is a rear view partially showing the seat belt device and FIG. 5(b) is a side view partially showing the seat belt device.

FIGS. 6(a), 6(b) schematically show a lap anchor and a hitch member used in the embodiment shown in FIGS. 5(a), 5(b) wherein FIG. 6(a) is a perspective view thereof and FIG. 6(b) is an illustration showing the locked state.

FIG. 7 is similar to FIGS. 6(a), 6(b) but schematically showing a lap anchor and a hitch member of further another embodiment of the present invention wherein FIG. 7 is a perspective view thereof.

FIGS. 8(a), 8(b) are illustrations similar to FIG. 1, but showing variation examples of the present invention wherein FIG. 8(a) shows a variation example and FIG. 8(b) shows another variation example.

FIGS. 10(a)-10(e) show a portion including the seat weight sensor and a slide bar shown in FIG. 9, wherein FIG. 10(a) is a plan view thereof, FIG. 10(b) is a side view thereof, FIG. 10(c) is a sectional view taken along a line XC-XC in FIG. 10(b), FIG. 10(d) is a partial view of a side wall of a mounting bracket when seen in a direction of arrow XD in FIG. 10(a), and FIG. 10(e) is a partial view of the slide bar at a portion XE in FIG. 10(a).

FIGS. 11(a), 11(b) are illustrations for explaining the attachment of the slide bar to the weight sensor, wherein FIG. 11(a) is a partially exploded view of one end side of the slide bar and FIG. 11(b) is a partially exploded view of the other end side of the slide bar at a portion XIB in FIG. 10(b).

FIGS. 12(a), 12(b) show another example of the mounting portion between the seat weight sensor and the slide bar, wherein FIGS. 12(a) and 12(b) are sectional views similar to FIGS. 10(d) and 10(e).

DETAILED DESCRIPTION

Hereinafter, embodiments of the present invention will be described with reference to the attached drawings.

Figure 1:
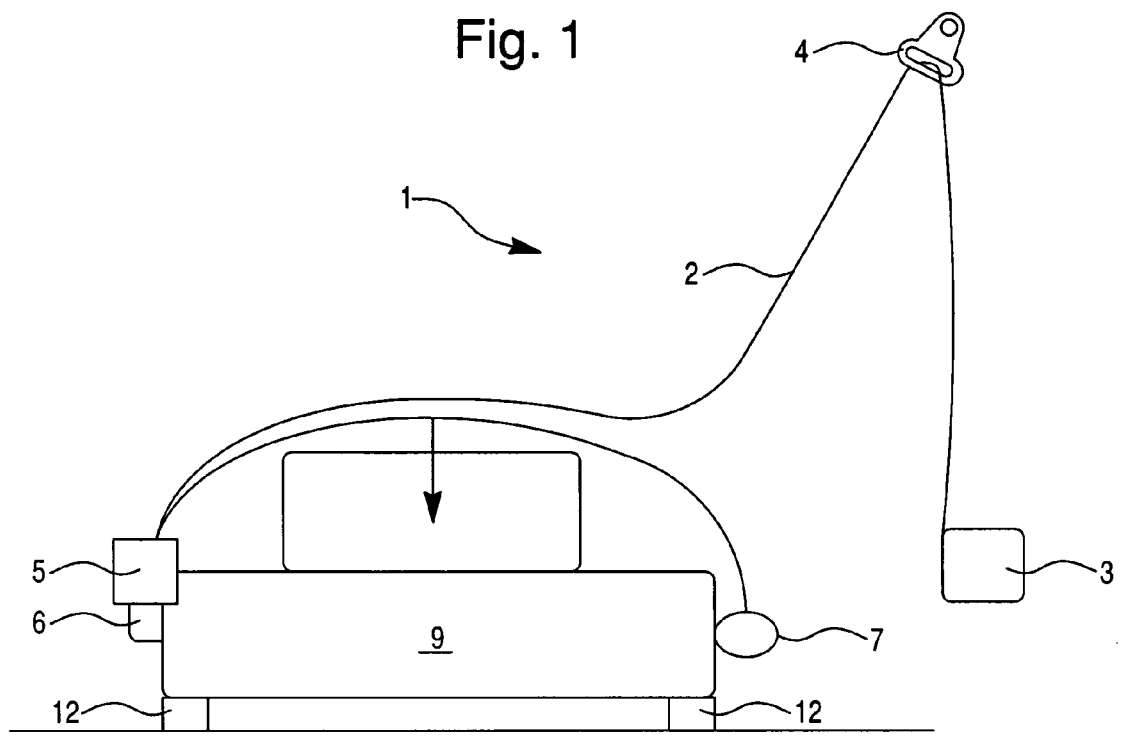
FIG. 1 is an illustration schematically showing an example of an embodiment of a seat belt device according to the present invention that is adopted to a three-point seat belt device.
Figure 2A:
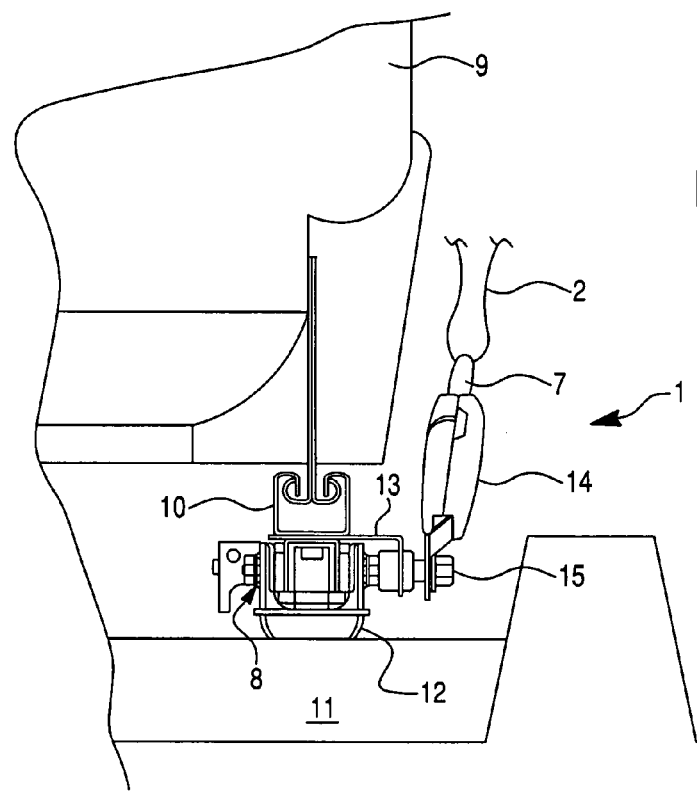
Figure 2B:
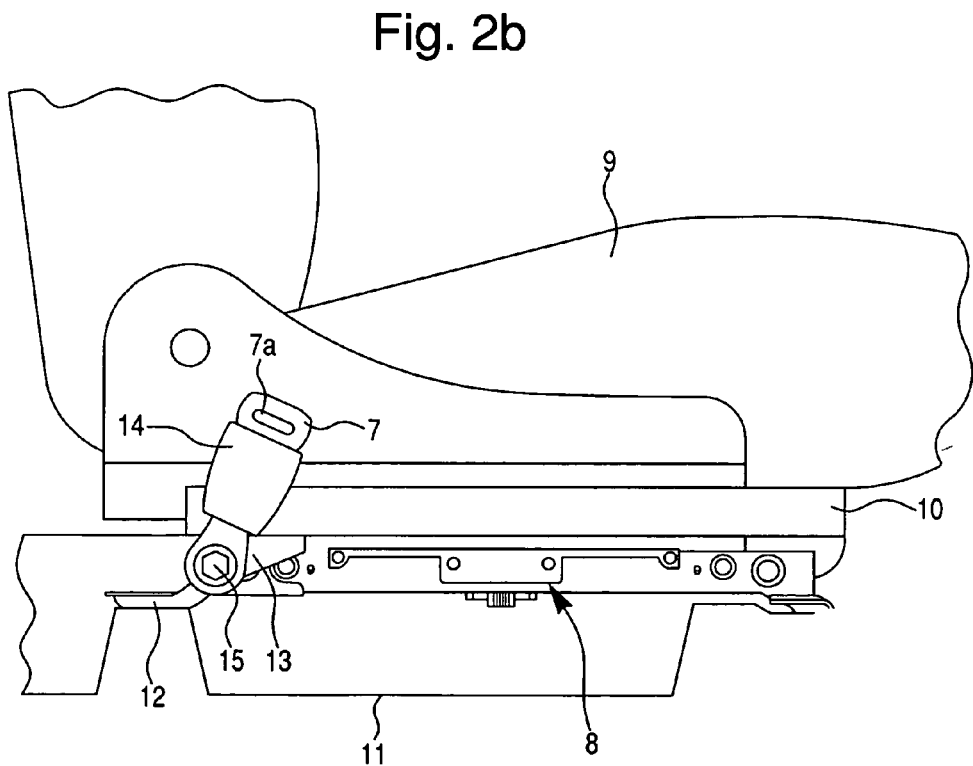

FIG. 1 is an illustration schematically showing an example to which an embodiment of a seat belt device according to the present invention is adopted to a three-point seat belt device, and FIGS. 2(a), 2(b) specifically show portions of the seat belt device of this embodiment wherein FIG. 2(a) is a rear view partially showing the seat belt device and FIG. 2(b) is a side view partially showing the seat belt device.

As shown in FIG. 1, the seat belt device 1 of this embodiment is a three-point seat belt device which comprises a seat belt 2, a seat belt retractor 3 for winding up the seat belt 2, a deflective fitting 4 attached to a vehicle body such as a center pillar, and a tongue 5 slidably supported by the seat belt 2. The seat belt device 1 comprises a buckle 6 to which the tongue 5 is detachably latched and a lap anchor 7 fixed to an end opposite to the end of the seat belt 2 to which the retractor 3 is connected. However, there is a different point from the conventional seat belt device that the buckle 6 and the lap anchor 7 are attached to a vehicle seat 9 provided at its lower portion with a seat weight sensor (described later) or attached to the seat weight sensor (in the example shown in FIGS. 2(a), 2(b), the lap anchor 7 is attached to the seat weight sensor). All the seat belt 2, the seat belt retractor 3, the deflective fitting 4, the tongue 5 and the buckle 6 are the same as used in the conventional typical three-point seat belt device, that is, well known, so the detail description of these components will be omitted.

As shown in FIGS. 2(a) and 2(b), similarly to the seat belt devices disclosed in the aforementioned Japanese Patent Unexamined Publication No. H11-304579, and Japanese Patent Unexamined Publication No. H11-351952 (both incorporated by reference), a seat rail 10 is fixed below the vehicle seat 9 and a seat bracket 12 is fixed to a vehicle body floor 11 such that the seat weight sensor 8 is disposed between the seat rail 10 and the seat bracket 12, i.e. below the vehicle seat 9. This seat weight sensor 8 is designed to measure the load applied to the vehicle seat 9. The seat weight sensor 8 is also the same as disclosed in the aforementioned Japanese Patent Unexamined Publication No. H11-304579 and Japanese Patent Unexamined Publication No. H11-351952 (both incorporated by reference), so the detailed description of this will be omitted. It should be noted that the seat weight sensor 8 is not limited to the seat weight sensor disclosed in Japanese Patent Unexamined Publication No. H11-304579 and Japanese Patent Unexamined Publication No. H11-351952 (both incorporated by reference), and may be another seat weight sensor which is conventionally known.

Between the seat rail 10 and the seat weight sensor 8, the seat weight sensor 8 is provided with a mounting bracket 13. A hitch member 14 is attached to the mounting bracket 13 by a bolt 15. As schematically shown in FIG. 3, the hitch member 14 has a casing 14a, and a supporting member 14c to which the casing 14a is supported by a mounting pin 14h. The supporting member 14c is attached to a mounting bracket 13.

On the other hand, the lap anchor 7 is fixed to an end 2a of the seat belt 2 opposite to the retractor side by folding a portion of the seat belt 2 after passed through a hole 7a of the lap anchor 7 and then sewing together the folded portion. The lap anchor 7 comprises an engaging hook 7b having an engaging concavity $7b_1$. By inserting the engaging hook 7b into the casing 14a through an insertion opening $14a_1$ formed in the casing 14a of the hitch member 14 and engaging the engaging hook 7b with an engageable portion which is not shown, the lap anchor 7 is locked to the hitch member 14 [FIGS. 2(a) and 2(b) show a state where the lap anchor 7 is locked to the hitch member 14]. Though the locking mechanism between the lap anchor 7 and the hitch member 14 is not concretely shown in FIG. 3, the locking mechanism may be any of conventionally known locking mechanisms, such as a conventionally known locking mechanism between a buckle and a tongue, which can lock the lap anchor 7 to the hitch member 14 when the lap anchor 7 is inserted into the casing. Therefore, the concrete description of the locking mechanism will be omitted. Moreover, the lap anchor 7 and the hitch member 14 may be designed not to allow the release of the locking therebetween or may be designed to allow the release of the locking therebetween by means of a release operation member such as a release button. When the lap anchor 7 and the hitch member 14 are designed to allow the release of the locking therebetween, it is preferable that the release operation is a difficult task.

In the seat belt device 1 of this embodiment having the aforementioned structure, the seat weight sensor 8 and the vehicle seat 9 are fixed to the vehicle body floor 11 in a state that the hitch member 14 is previously mounted to the seat weight sensor 8 via the mounting bracket 13 and the bolt 15 and, after that, the lap anchor 7 fixed to the end 2a of the seat belt 2 is locked to the hitch member 14 as mentioned above, thereby connecting the end 2a of the seat belt 2 to the hitch member 14 (that is, the vehicle body).

Therefore, according to the seat belt device 1 of this embodiment, the end 2a of the seat belt 2 can be easily connected to the hitch member 14 just by locking the lap anchor 7 to the hitch member 14 even when the seat weight sensor 8 is installed under the vehicle seat 9. Accordingly, the labor and time required for connecting the seat belt 2 can be significantly reduced, thus improving the workability and the productivity.

Since the buckle 6 and the hitch member 14 are attached to the seat weight sensor 8, the seat weight sensor 8 is prevented from being influenced by belt tension from the buckle 6 side or belt tension from the hitch member 14 side so that the seat weight sensor 8 can detect the actual seat load.

Figure 4A:
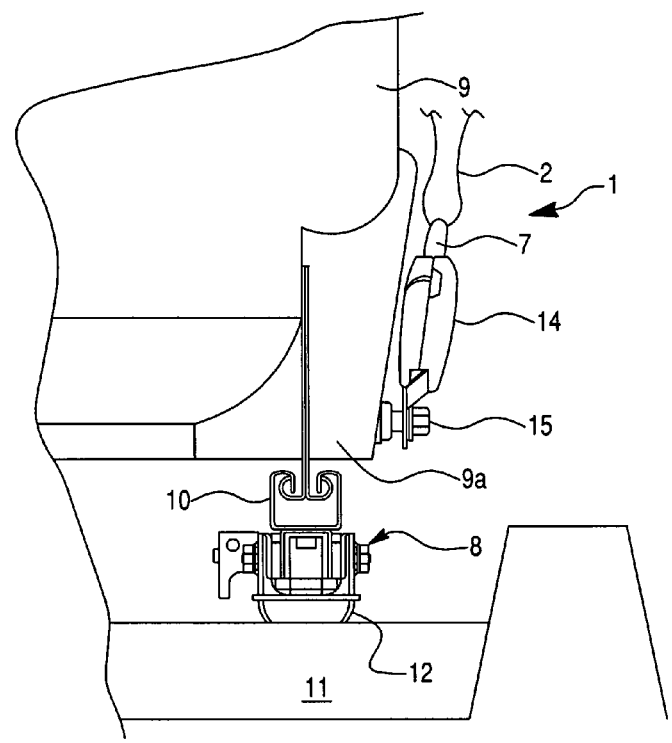
Figure 4B:
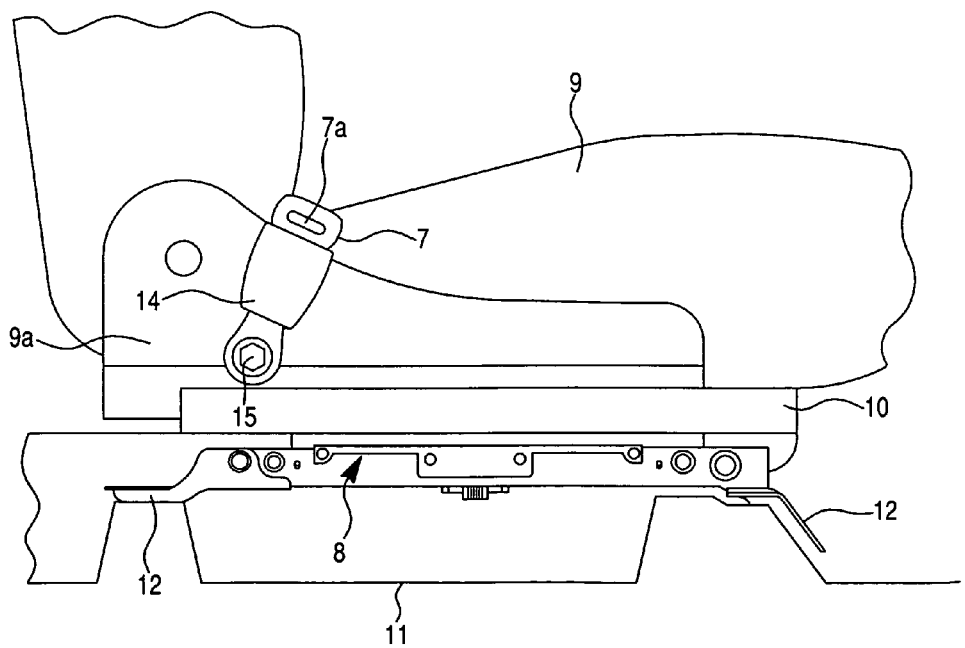

FIGS. 4(a), 4(b) are illustrations showing another embodiment of the present invention. In the following description of respective embodiments, the same components as those of the preceding embodiment(s) are marked with the same numerals, so detail description of the components will be omitted.

Though the hitch member 14 is attached to the seat weight sensor 8 in the aforementioned embodiment shown in FIGS. 2(a), 2(b), a hitch member 14 is attached to a side 9a of a vehicle seat 9 in a seat belt device 1 of this embodiment as shown in FIGS. 4(a), 4(b)

The other structure of the seat belt device of this embodiment is the same as that of the embodiment shown in FIG. 1 through FIG. 3. The works and effects of the seat belt device 1 of this embodiment are also the same as those of the embodiment shown in FIG. 1 through FIG. 3.

Figure 5A:
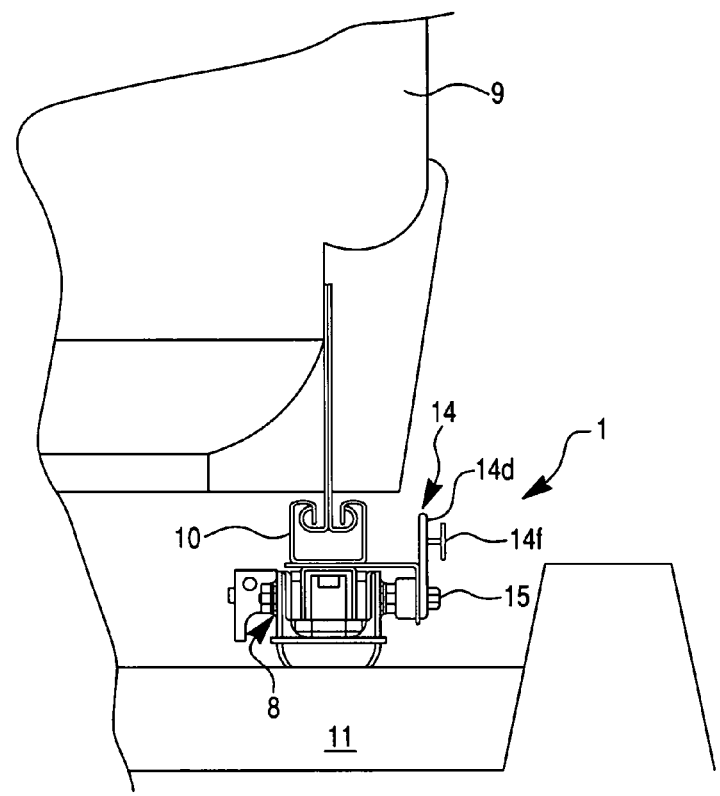
Figure 5B:
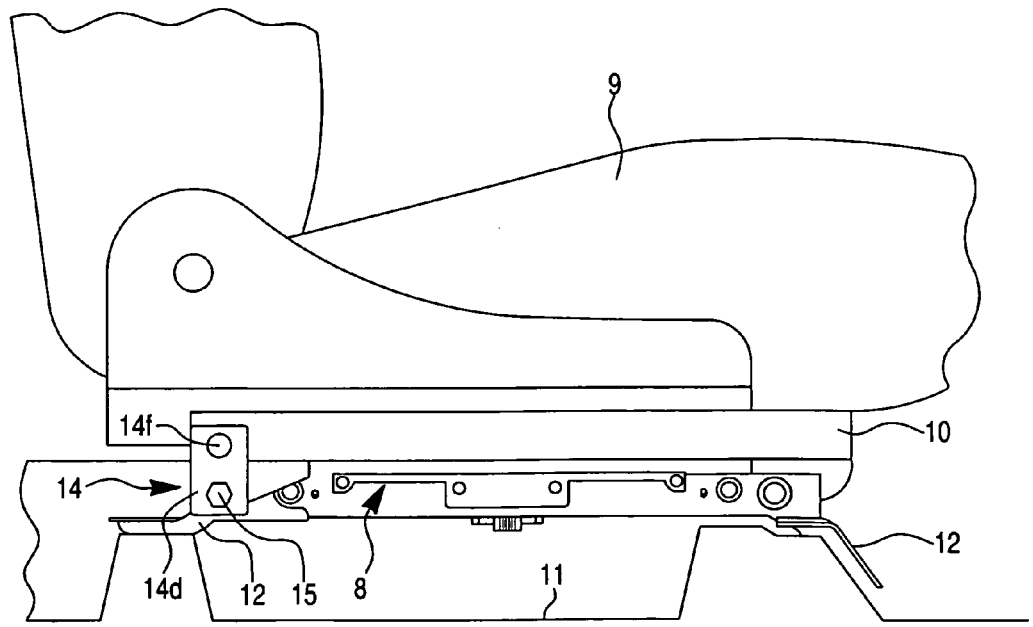
Figure 6A:
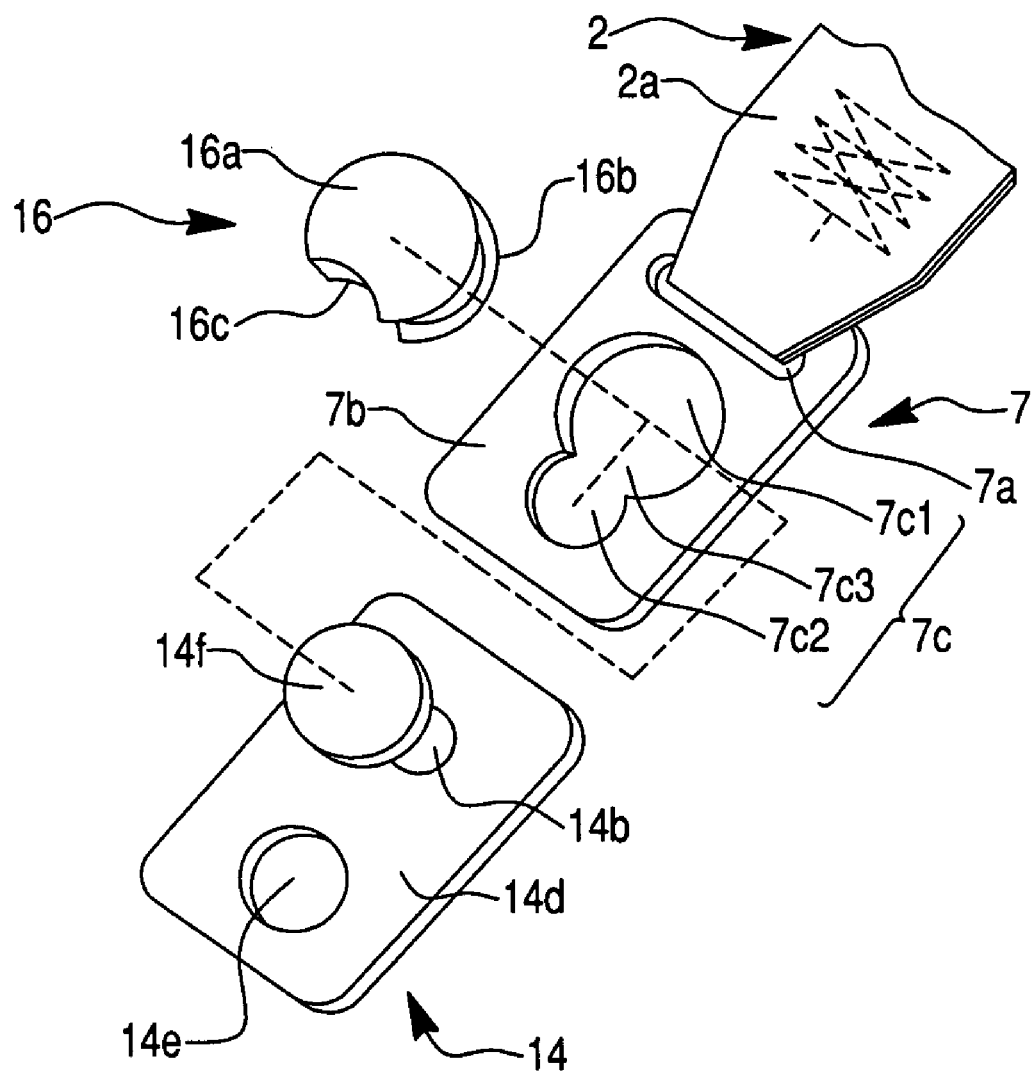
Figure 6B:
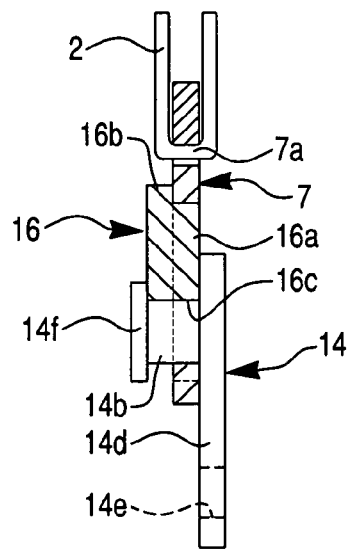

FIGS. 5(a), 5(b) are illustrations similar to FIGS. 2(a), 2(b), but showing another embodiment of the present invention and FIGS. 6(a), 6(b) schematically show a lap anchor and a hitch member used in this embodiment wherein FIG. 6(a) is a rear view thereof and FIG. 6(b) is a side view thereof.

As shown in FIGS. 5(a) and 5(b), a hitch member 14 of a seat belt device 1 is attached to a seat weight sensor 8 similarly to the embodiment shown in FIGS. 2(a), 2(b). The hitch member 14 is attached to the seat weight sensor 8 using a mounting bracket 13 and a bolt 15 in the same manner as shown in FIGS. 2(a), 2(b).

In the aforementioned embodiment shown in FIGS. 2(a), 2(b), the engaging hook 7b of the lap anchor 7 is inserted into the casing 14a of the hitch member 14 and is engaged with the engageable portion inside the casing. As shown in FIG. 6(a), however, the structures and the locking method of the hitch member 14 and the lap anchor 7 of the seat belt device 1 according to this embodiment are different from the embodiment shown in FIGS. 2(a), 2(b). That is, the hitch member 14 of this embodiment has a body 14d composed of a rectangular flat plate, a cylindrical engageable portion 14b formed on a portion near one end of the body 14d, and a circular mounting hole 14e formed in a portion near the other end of the body 14d through which the mounting bolt 15 is inserted. In this case, formed at the end of the engageable portion 14b is a circular falling preventive flange 14f which has a diameter larger than the diameter of the engageable portion 14b.

On the other hand, the lap anchor 7 is composed of a rectangular flat plate similarly to the body 14d of the hitch member 14 and has a hole 7a formed in a portion near an end, through which the end 2a of the seat belt 2 is passed. A portion of the lap anchor 7 extending from the middle to the other end is an engaging portion 7b. The engaging portion 7b is provided with an engaging hole 7c which is formed in a guitar-shape comprising a large diameter hole $7c_1$, a small diameter hole $7c_2$, and a boundary portion $7c_3$ at which the holes $7c_1$ and $7c_2$ are partly superposed on each other. The diameter of the large diameter hole $7c_1$ is set to be larger than the diameter of the falling preventive flange 14f so that the flange 14f can pass through the large diameter hole $7c_1$. The diameter of the small diameter hole $7c_2$ is set to be larger than the diameter of the engageable portion 14b and smaller than the diameter of the flange 14f so that the engageable portion 14b can pass through the small diameter hole $7c_2$, but the falling preventive flange 14f can not pass through the small diameter hole $7c_2$. Further, the width of the boundary portion 7c3 between the large diameter hole $7c_1$ and the small diameter hole $7c_2$ is set to allow the engageable portion 14b to pass through the boundary portion $7c_3$.

Further, a locking member 16 is provided. The locking member 16 comprises a body 16a having such a diameter that it can be fitted in the large diameter hole $7c_1$ and can not pass through the boundary portion $7c_3$, a circular flange 16b which is formed on one end of the body 16a and has such a diameter that it can not be fitted in the large diameter hole $7c_1$, and a retaining portion 16c which is formed in the peripheries of the body 16a and the circular flange 16b and has an arc concave shape of which diameter is the same as the diameter of the engageable portion 14b.

As shown in FIGS. 5(a) and 5(b), the mounting bracket 13 is fixed to the seat weight sensor 8. The lap anchor 7 fixed to the seat belt 2 is brought to encircle the engageable portion 14b and the falling preventive flange 14 of the hitch member 14, secured to the mounting bracket 13 by the bolt 15, such that the large diameter hole $7c_1$ of the lap anchor 7 passes over the falling preventive flange 14f and is positioned around the engageable portion 14b. After that, the lap anchor 7 is moved to pass the boundary portion $7c_3$ such that the engageable portion 14b is positioned in the small hole $7c_2$. As shown in FIG. 6(b), in the state that the lap anchor 7 is in contact with the body 14d of the hitch member 14, the body 16a of the locking member 16 is fitted into the large-diameter hole $7c_1$ such a manner that the retaining portion 16c faces the outer surface of the engageable portion 14b.

At this point, the body 16a of the locking member 16 is almost sandwiched between the falling preventive flange 14f and the body 14d so that the locking member 16 is prevented from falling off by the falling preventive flange 14f. In this state, the retaining portion 16c of the locking member 16 faces the outer surface of the engageable portion 14b, thereby preventing the engageable portion 14b from shifting toward the large diameter hole $7c_1$. Therefore, the locking between the hitch member 14 and the lap anchor 7 is ensured, thereby preventing undesirable release between the hitch member 14 and the lap anchor 7. In this manner, the lap anchor 7 fixed to the end 2a of the seat belt 2 is locked to the hitch member 14 so that the seat belt 2 is connected to the hitch member 14, i.e. the vehicle body.

The other structure, works and effects of the seat belt device 1 of this embodiment are the same as those of the embodiment shown in FIG. 1 through FIG. 3. The hitch member 14 of this embodiment may be attached to the vehicle seat 9 similarly to the embodiment shown in FIGS. 4(a), 4(b).

Figure 7:
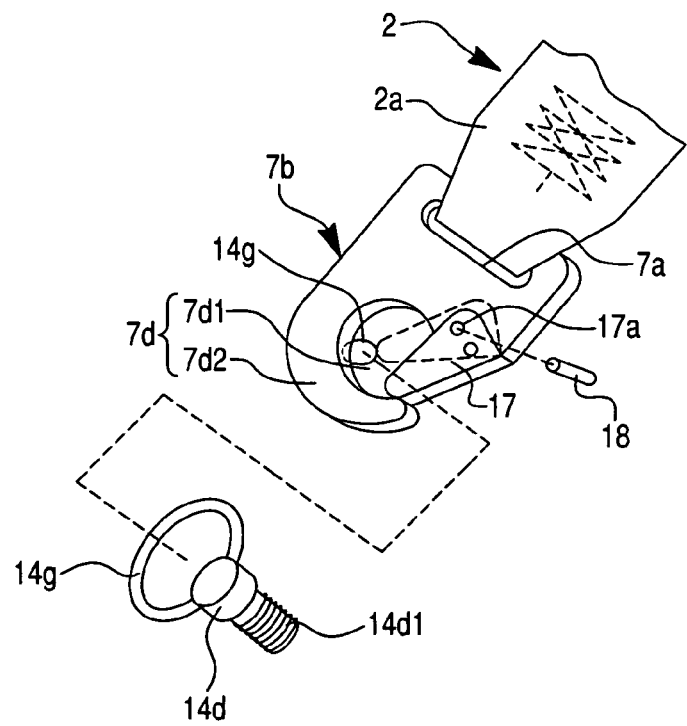

FIG. 7 is an illustration similar to FIG. 6(a), but showing another embodiment of the present invention and schematically showing a lap anchor and a hitch member employed in this embodiment.

In the aforementioned embodiment shown in FIGS. 6(a), 6(b), the lap anchor 7 is locked to the hitch member 14 by inserting the engageable portion 14b projecting from the body 14a of the hitch member 14 into the guitar-shaped engaging hole 7c of the lap anchor 7, and the release between the lap anchor 7 and the hitch member 14 is prevented by means of the locking member 16. In a seat belt device 1 of this embodiment, however, the structures of a hitch member 14 and a lap anchor 7 and the locking method thereof are different from those of the embodiment shown in FIGS. 6(a), 6(b).

That is, the hitch member 14 of this embodiment has a column-like body 14d and a circular or square ring-like engageable portion 14g which is attached to one end of the body 14d in such a manner as to swing or not to swing. The body 14d is provided with an external thread $14d_1$ for fixing the hitch member 14 which is formed from a middle portion to the other end of the body 14d.

Similarly to the embodiment shown in FIGS. 6(a), 6(b), the lap anchor 7 has a hole 7a formed in a portion near an end through which the end 2a of the seat belt 2 is passed, and a portion of the lap anchor 7 extending from the middle to the other end is an engaging portion 7b. However, the engaging portion 7b is different from that of the embodiment shown in FIGS. 6(a), 6(b) and is a hook-like engaging portion 7b. The hook-like engaging portion 7b is provided with a hooking pawl $7d_2$ forming an engaging concavity $7d_1$.

The lap anchor 7 has a pawl-like locking member 17 which is pivotally disposed for closing the opening of the engaging concavity $7d_1$. The radius of gyration of the locking member 17 and the configuration and the size of the engaging concavity $7d_1$ are set such that when the locking member 17 is in a position closing the opening of the engaging concavity $7d_1$ as shown by solid lines, the locking member 17 is in contact with the hooking pawl $7d_2$ and is thus prevented from rotating in the counter clockwise direction in FIG. 7, and when the locking member 17 is rotated at a certain angle in the clockwise direction in FIG. 7 as shown by dotted lines, the locking member 17 can be rotated without colliding with the ring-like engageable portion 14g positioned at the left side in FIG. 7 inside the engaging concavity $7d_1$.

Further, a retaining pin 18 is provided for retaining the locking member 17 in the position closing the opening of the engaging concavity $7d_1$. The retaining pin 18 is inserted into retaining holes 17a (the retaining hole of the lap anchor 7 is not shown) which are formed in the locking member 17 and the lap anchor 7, respectively and are aligned when the locking member 17 is in the position closing the opening of the engaging concavity $7d_1$, thereby retaining the locking member 17 in this position.

The hitch member 14 is attached to the seat weight sensor 8 similarly to the embodiment shown in FIGS. 5(a), 5(b) or to the vehicle seat 9 similarly to the embodiment shown in FIGS. 4(a), 4(b). The hook-like engaging portion 7d of the lap anchor 7 is engaged with the ring-like engageable portion 14g of the hitch member 14. In this case, the ring-like engageable portion 14g is passed through the opening of the engaging concavity $7d_1$, and is then positioned on the left side in FIG. 7 inside the engaging concavity $7d_1$. In this state, the locking member 17 is rotated in the counter clockwise direction in FIG. 7 to the position closing the opening of the engaging concavity $7d_1$. After that, the retaining pin 18 is inserted into the retaining holes 17a. In this manner, the lap anchor 7 fixed to the end 2a of the seat belt 2 is secured to the hitch member 14 so that the seat belt 2 is connected to the hitch member 14, i.e. the vehicle body.

The other structure, works and effects of the seat belt device 1 of this embodiment are the same as those of the aforementioned embodiment shown in FIGS. 6(a), 6(b).

Figure 8A:
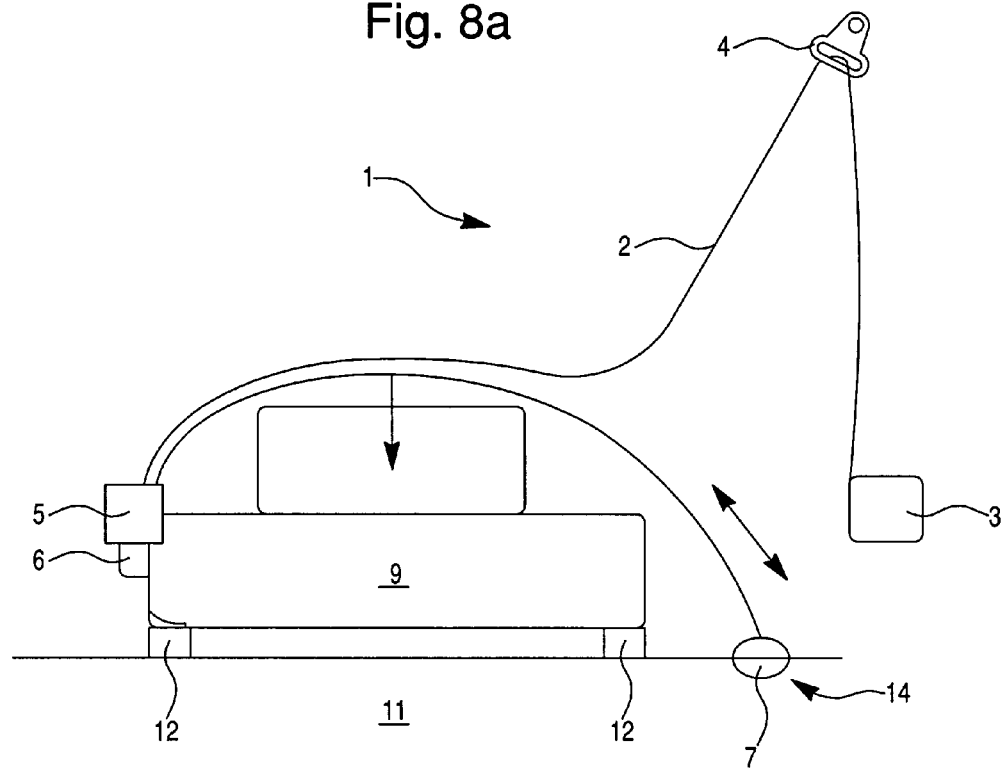
Figure 8B:
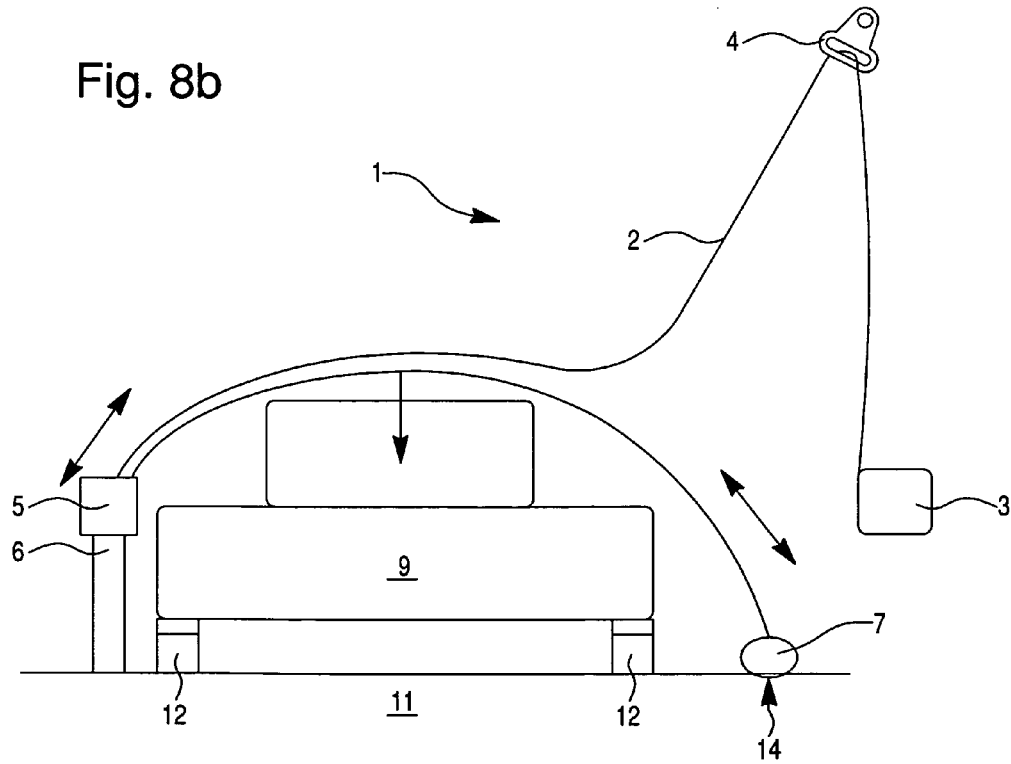

Though both the buckle 6 and the hitch member 14 are attached to the seat weight sensor 8 or the vehicle seat 9 in any of the aforementioned embodiments, the present invention is not limited thereto. For example, as shown in FIG. 8(a), the hitch member 14 may be attached to the vehicle body floor 11 while the buckle 6 is attached to the seat weight sensor 8. As shown in FIG. 8(b), both the buckle 6 and the hitch member 14 may be attached to the vehicle body floor 11. Further, the buckle 6 may be attached to the vehicle body floor while the hitch member 14 is attached to the seat weight sensor 8, but this case is not shown. In these cases, however, the seat weight sensor 8 is influenced by belt tension from the buckle side and/or the hitch member side fixed to the vehicle body floor 11 so that the seat weight sensor 8 can not detect the actual seat load. Accordingly, it is necessary to compensate the belt tension influencing relative to the seat weight sensor 8. Therefore, it is preferable that both the buckle 6 and the hitch member 14 are attached to the seat weight sensor 8 or the vehicle seat 9.

Figure 9:
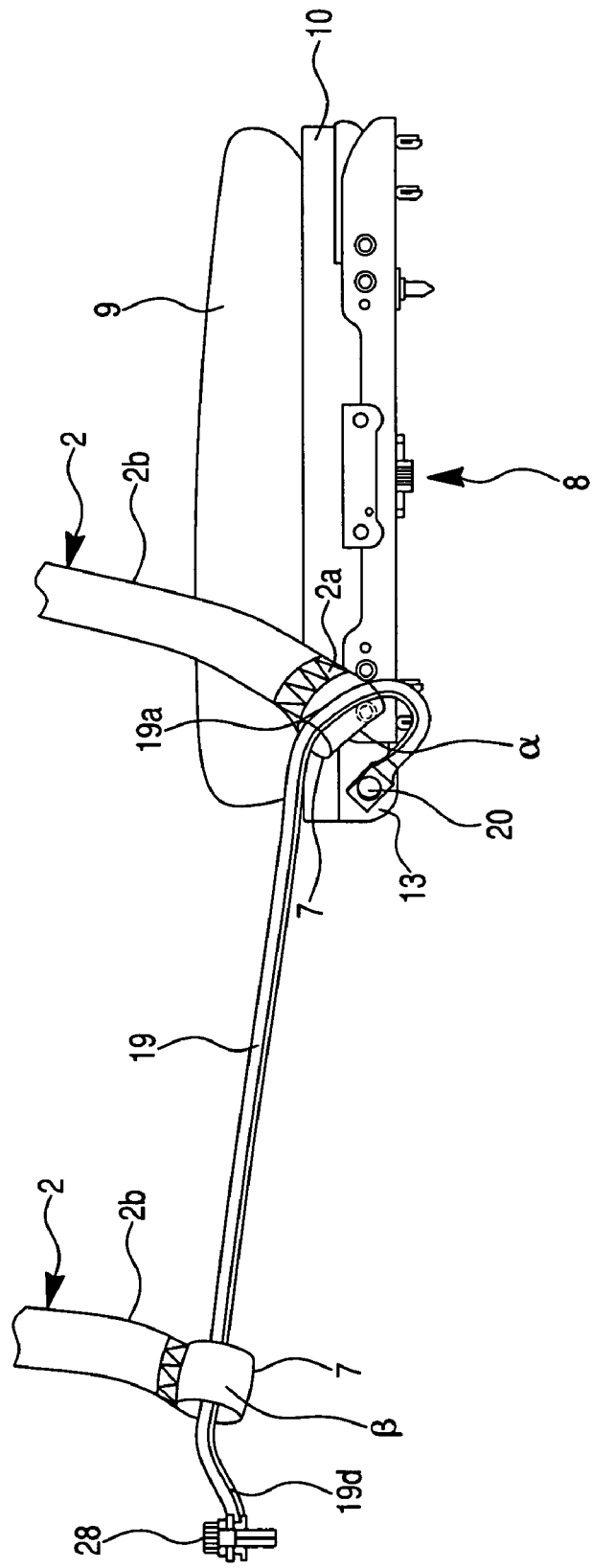
FIG. 9 is an illustration schematically and partially showing a lap anchor and a hitch member according to further another embodiment of the present invention.

FIG. 9 is an illustration schematically and partially showing a lap anchor and a hitch member according to further another embodiment of the present invention.

As shown in FIG. 9, in a seat belt device 1 of this embodiment, an end of a slide bar 19 which also functions as the hitch member is attached to a mounting bracket 13 of the seat weight sensor 8. The slide bar 19 extends along one of the both lateral sides of the vehicle body toward the rear of the vehicle so that the other end of the slide bar 19 is fixed to the vehicle body such as a floor 11.

Figure 10C:
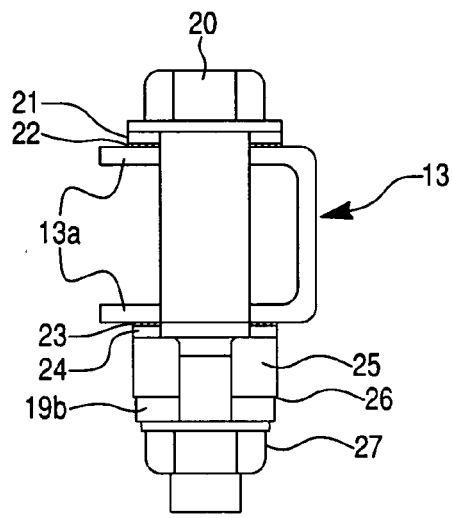
Figure 10D:
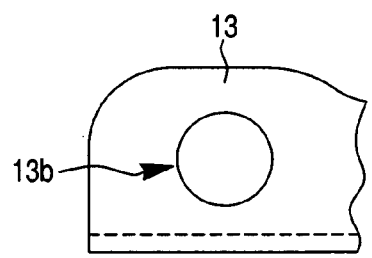

As shown in FIGS. 10(a) and 10(b), a portion of the slide bar 19 on the one end side is substantially curved in a U shape to compose a hitch portion 19a. The end 19b of the hitch portion 19a is attached to side walls 13a of the mounting bracket 13. In this case, as shown in FIG. 10(c) and FIG. 11(a), a mounting bolt 20 is inserted into a ring-shape wave washer 21, a ring-shape spacer 22, holes 13b formed in the both side walls 13a, a ring-shape spacer 23, a wave washer 24, a bush 25, a CS ring 26, and a hole 19c formed in the end 19b of the slide bar 19 and is screwed with a nut 27, thereby attaching the one end side of the slide bar 19 to the mounting bracket 13. In this case, the holes 13b formed in the both side walls 13a are each formed into such a circular shape allowing the insertion of the mounting bolt 20 with very little space as shown in FIG. 10(d).

Figure 10E:
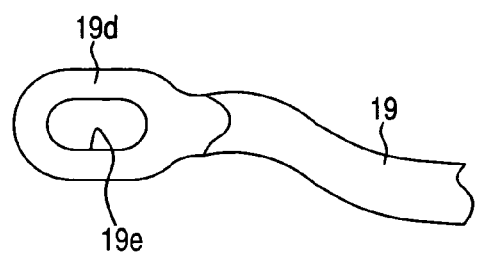

As shown in FIG. 10(e), the slide bar 19 is also provided with an elongated hole 19e formed in the other end 19d thereof. As shown in FIG. 11(b), after a mounting bolt 28 is inserted into a ring-shape wave washer 29, a ring-shape spacer 30, the hole 19e of the slid bar 19, a bush 31, a plane washer 32, and a CS ring 33, the mounting bolt 28 is screwed into an internal thread formed in the vehicle body, thereby fixing the other end side of the slide bar 19 to the vehicle body. Since the hole 19e is an elongated hole, the alignment relative to the holes 13b of the mounting bracket 13 and the hole 19b of the slide bar 19 can be easily and securely performed, thus facilitating the insertion of the mounting bolt.

On the other hand, as shown in FIG. 9, a lap anchor 7 is formed at the end of a lap belt portion 2b of a seat belt 2. The lap anchor 7 is formed in a loop shape by sewing the end of the lap belt portion 2a in the folded state (the sewn portion is marked with A). The loop-shape lap anchor 7 is coupled with the slide bar 19 so that the lap anchor 7 can slide relative to slide bar 19. Therefore, the loop-shape lap anchor 7 can be guided along the slide bar 19 to move between its working position a on the curved hitch portion 19a of the slide bar 19 and its standby position β behind the working position a.

In the seat belt device 1 of this embodiment having the aforementioned structure, when an occupant is seated and is about to put on the seat belt 2, the occupant first sets the lap anchor 7 at the working position a and then inserts a tongue 5 into a buckle 6 to latch similarly to conventional seat belt devices. In this manner, the seat belt 2 is put on. Since the lap anchor 7 is positioned at the curved portion of the hitch portion 19a of the slide bar 19, tensile force acting on the lap belt portion 2b acts in a direction substantially perpendicular to the curved portion of the hitch portion 19a. Therefore, the lap anchor 7 is prevented from moving from the working position a, whereby the seat belt 2 can securely restrain and protect the occupant in the event of emergency.

For example, in case that the seat belt device 1 of this embodiment is installed to a vehicle of two-door type, when a rear seat passenger is about to get in or out of the vehicle, the lap anchor 7 is set at the standby position β so as to allow the rear seat passenger to get on or off the vehicle. When the passenger gets in or out of the vehicle, the lap belt 2b does not disturb the action of the passenger because the lap anchor 7 is set at the standby position β, thereby allowing the passenger to easily get in or out of the vehicle. After the passenger gets in the vehicle, an occupant sitting on a front seat can normally put on the seat belt 2 by setting the lap anchor 7 at the working position a. The seat belt device 1 of this embodiment is not limited to the vehicle of two-door type and is useful for vehicles of a type having a possibility that the lap belt 2b including the lap anchor 7 disturbs the action of a passenger.

The other structure and the other works and effects of the seat belt device 1 according to this embodiment are the same as those of the preceding embodiments.

Figure 12A:
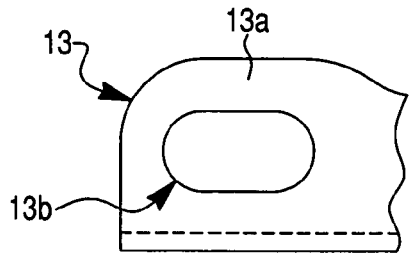
Figure 12B:
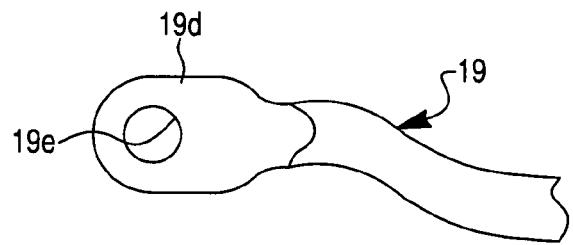

FIGS. 12(a), 12(b) show another example of the mounting portion between the seat weight sensor and the slide bar, wherein FIGS. 12 (a) and 12(b) are sectional views (sic) similar to FIGS. 10(d) and 10(e).

Though the holes 13b are circular holes and the hole 19e is an elongated hole in the embodiment shown in FIGS. 10(d) and 10(e), the holes 13b are elongated holes and the hole 19 is a circular hole in this example as shown in FIGS. 12(a) and 12(b).

The other structure and the other works and effects of the seat belt device 1 according to this example are the same as those of the embodiment shown in FIG. 9 through FIG. 11(b).

Figure 13:
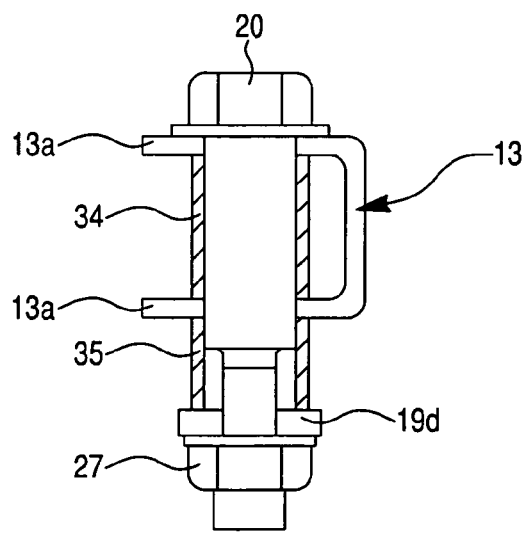
FIG. 13 is a sectional view similar to FIG. 10(c) showing a variation of the mounting portion between the seat weight sensor and the slide bar.

FIG. 13 is a sectional view similar to FIG. 10(c) showing a variation of the mounting portion between the seat weight sensor and the slide bar.

Though the mounting bolt 20 is simply inserted into the holes 13b of the mounting bracket 13 in the embodiment shown in FIG. 10(c), a collar 34 is disposed between the both side walls 13a of the mounting bracket 13 and another collar 35 is disposed between the side wall 13a of the mounting bracket 13 and the other end 19d of the slide bar 19 in this example as shown in FIG. 13. By disposing the collars 34, 35 as mentioned above, the both side walls 13a of the mounting bracket 13 is prevented from being deformed, thereby rigidly fixing the slide bar 19 to the both side walls 13a of the mounting bracket 13.

The other structure and the other works and effects of the seat belt device 1 according to this example are the same as those of the embodiment shown in FIG. 9 through FIG. 11(b).

Though the seat belt device of the present invention is adopted to a three-point seat belt device in the description of the aforementioned embodiments, the seat belt device of the present invention may be adopted to any type of seat belt devices where a seat weight sensor 8 is installed below a vehicle seat 9 and an end of a seat belt 2 is connected to the seat weight sensor or a vehicle body.

A seat belt device of the present invention can be suitably applied to a seat belt device for a vehicle which is provided with a seat weight sensor, installed below a vehicle seat, for measuring a seat load applied to the vehicle seat, of which a seat belt for restraining and protecting an occupant sitting on a vehicle seat is connected to a vehicle body at least on a side of the vehicle seat.

The priority applications, Japanese Patent Application No. 2003-16498, filed on Jan. 24, 2003 and Japanese Patent Application No. 2003-290194, filed on Aug. 8, 2003, including the specification, drawings, claims and abstract, are incorporated herein by reference in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt device comprising a seat belt for restraining and protecting an occupant sitting on a vehicle seat, and a lap anchor fixed to an end of the seat belt,
   wherein the seat belt is connected to a vehicle component on a side of the vehicle seat via the lap anchor, a seat weight sensor installed below the vehicle seat measures a seat load applied to said vehicle seat, and the action of the seat belt device is controlled on the basis of the measured value of the seat load,
   wherein said lap anchor is locked to a hitch member by an engaging hook of the lap anchor, and wherein the hitch member is directly attached to a mounting bracket of the seat weight sensor, the mounting bracket positioned between a seat rail and the seat weight sensor.

2. The seat belt device of claim 1, wherein the hitch member includes a supporting member and a casing, the supporting member connected to the mounting bracket, and the casing including an insertion opening to receive the engaging hook.

3. The seat belt device of claim 1, wherein the engaging hook includes an engaging concavity to engage and lock with the hitch member.

4. The seat belt device of claim 1, wherein the lap anchor is unreleasably locked to the hitch member.

5. The seat belt device of claim 1, wherein the lap anchor is releasably locked to the hitch member.

6. A seat belt device, comprising:
   a hitch member directly attached to a mounting bracket of a seat weight sensor, the mounting bracket positioned between a seat rail and the seat weight sensor;
   a lap anchor attached to a hitch member;
   wherein the lap anchor comprises an engageable hook to lock to the hitch member.

7. The seat belt device of claim 6, wherein the seat weight sensor is positioned underneath a vehicle seat.

8. The seat belt device of claim 6, further comprising a buckle attached to the seat weight sensor.

9. The seat belt device of claim 6, wherein the lap anchor is unreleasably locked to the hitch member.

10. The seat belt device of claim 6, wherein the lap anchor is releasably locked to the hitch member.

* * * * *